US005587699A

United States Patent [19]
Faloon et al.

[11] Patent Number: 5,587,699
[45] Date of Patent: Dec. 24, 1996

[54] EXTERIOR MIRROR WITH INFORMATION DISPLAY

[75] Inventors: Michael D. Faloon, Northville, Mich.; William Perry, Palestine, Ohio; Arthur Hess, Troy, Mich.

[73] Assignee: United Technologies Automotive Systems Inc., Dearborn, Mich.

[21] Appl. No.: 333,891

[22] Filed: Nov. 3, 1994

[51] Int. Cl.$^6$ ............................................. B60Q 1/34
[52] U.S. Cl. .................... 340/475; 340/468; 116/202; 362/83.1; 362/30; 362/290
[58] Field of Search ................................ 340/475, 468; 116/202; 362/83.1, 290, 30

[56] References Cited

U.S. PATENT DOCUMENTS

| | | | |
|---|---|---|---|
| 2,263,382 | 11/1941 | Gotzinger | 362/83.1 |
| 2,580,014 | 9/1949 | Gazda | 362/83.1 |
| 2,790,350 | 4/1957 | Cameron | 88/77 |
| 4,274,078 | 6/1981 | Isobe et al. | 116/202 |
| 4,882,565 | 11/1989 | Gallmeyer | 340/461 |
| 4,906,085 | 3/1990 | Sugihara et al. | 350/601 |
| 5,014,167 | 5/1991 | Roberts | 362/83.1 |
| 5,016,996 | 5/1991 | Ueno | 350/600 |
| 5,076,674 | 12/1991 | Lynam | 359/274 |
| 5,124,845 | 6/1992 | Shimojo | 359/838 |
| 5,179,471 | 1/1993 | Caskey et al. | 359/603 |
| 5,207,492 | 5/1993 | Roberts | 362/30 |
| 5,303,130 | 4/1994 | Wei et al. | 362/83.1 |
| 5,313,335 | 5/1994 | Gray et al. | 359/839 |
| 5,373,392 | 12/1994 | Bala | 359/241 |
| 5,416,313 | 5/1995 | Larson et al. | 250/214 AL |

FOREIGN PATENT DOCUMENTS

| | | |
|---|---|---|
| 2806468 | 8/1978 | Germany . |
| 2161440 | 1/1986 | United Kingdom . |

*Primary Examiner*—Jeffery Hofsass
*Assistant Examiner*—Julie B. Lieu
*Attorney, Agent, or Firm*—Howard & Howard

[57] ABSTRACT

A mirror with an information display includes a mirror glass having a display section. In one embodiment, the mirror glass has a pyrolitic coating on a front surface and an opaque backmasking on the rear surface. Semi-transparent material, such as light control film, is disposed on the rear surface of the mirror glass at the display section. The display section is normally highly reflective of ambient light, but transmits light from a light source disposed behind the mirror glass when the light source is activated. In an alternate embodiment, light is directed from a light source onto the mirror glass at an angle, such that the light can be viewed by an adjacent vehicle, but the light does not interfere with the driver's reflective view in the mirror glass. Light from a light source is directed toward the outboard side of the mirror apparatus but is not visible when viewed from the inboard side of the mirror apparatus by the driver. In other embodiments, the light is directed onto or adjacent the front surface of the mirror. Alternatively, the light may be visible to the driver but not to the adjacent vehicles.

6 Claims, 2 Drawing Sheets

5,587,699

EXTERIOR MIRROR WITH INFORMATION DISPLAY

BACKGROUND OF THE INVENTION

The present invention relates to an exterior vehicle mirror including an information display.

Current motor vehicles include turn signals at the front and rear of the vehicle to alert other drivers when the vehicle is turning or making a lane change. It has been recognized that a third brake light at the rear of the vehicle provides a more conspicuous indication to other drivers when the vehicle is braking. Turn signals have not been as conspicuous to an adjacent vehicle, and a third turn signal would be advantageous. However, styling considerations have generally dictated against the use of additional lights on the sides of the vehicles.

Similarly, styling considerations with respect to the location of warning lights and information displays on the instrument panel have created a need for new locations for warning lights and information displays for the driver. This need has been increased by the use of on-board computer systems which have increased the amount of information available to be displayed to the driver. Further, it is desirable to provide information to the driver without requiring the driver to look down at the instrument panel, away from the road.

One known exterior side mirror includes a turn signal indicator displayed in the mirror glass. The known mirror apparatus utilizes a mirror glass which is reflective of most visible light wavelengths but substantially transparent to a small predetermined band of light wavelengths. A turn signal indicator is displayed by an LED array behind the mirror glass generating light of the small predetermined wavelength. The band of light is transmitted through the mirror glass and displayed to the driver of the adjacent vehicle. However, the method for manufacturing the mirror glass which transmits only the predetermined wavelength is expensive. In addition, the light sources required to generate light of the predetermined wavelength are more expensive than a light source which generates a wider spectrum of light wavelengths.

SUMMARY OF THE INVENTION

The present invention provides an inexpensive mirror apparatus with an information display utilizing light of most visible wavelengths. The expensive prior art coating process is not required. In addition, simple light sources of most visible colors can be displayed by the present mirror apparatus. Preferably, a display section in the inventive mirror displays a turn signal which is visible to adjacent vehicles while providing the driver with a full reflective view of the area adjacent the vehicle. Alternate display sections display information to the driver which can be viewed as the driver checks the vehicle's exterior side mirror. The driver need not look down at the instrument panel.

Preferably, a mirror glass having a pyrolitic coating is utilized. The mirror glass is provided with an opaque backmasking on the rear surface, except at the display section. When provided with an opaque backmasking, the pyrolitic coated mirror glass appears highly reflective. The display section is provided with a semi-transparent backmasking such as a light control film. A light source is disposed behind the semi-transparent backmasking on the display sections to provide information. The semi-transparent backmasking provides the mirror glass with a reflective surface when the light source is deactivated and allows the light from the light sources to be transmitted through the mirror glass when the light sources are activated and through substantially the entire visual range.

Preferably, the light from the light sources is directed so that the light is only visible when viewed at predetermined angles, but the display section appears reflective when viewed from angles other than the predetermined angles. For example, a turn signal display section may be visible when viewed from the outboard side of the mirror apparatus by an observer in an adjacent vehicle. The mirror would remain reflective when viewed from the inboard side of the mirror by the driver of the vehicle. Similarly, a driver information display section may be visible when viewed from the inboard side of the mirror apparatus but would appear reflective when viewed from the outboard side of the mirror apparatus. The invention may use a light control film having embedded louvers to direct the light in a desired direction.

In other embodiments of the present invention, light from a light source is directed toward the outboard side of the mirror from a position forward of the mirror. In one embodiment, a second reflective surface is used to direct light from a light source disposed behind the mirror glass onto the front surface of the mirror glass at such an angle that it is reflected toward the outboard side of the mirror apparatus and is not visible by the driver. In another embodiment, the light source is disposed in front of the mirror glass. For purposes of clarity, the terms "front" and "rear" as used throughout with reference to the mirror glass, not the vehicle. Light directing means direct light from the light source onto the front surface of the mirror glass. The light is then reflected toward the outboard side of the mirror apparatus. In another embodiment of the present invention, the light source is disposed in front of the mirror glass surface toward the inboard side of the mirror apparatus. Light directing means direct light from the light source toward the outboard side of the mirror apparatus.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1A:
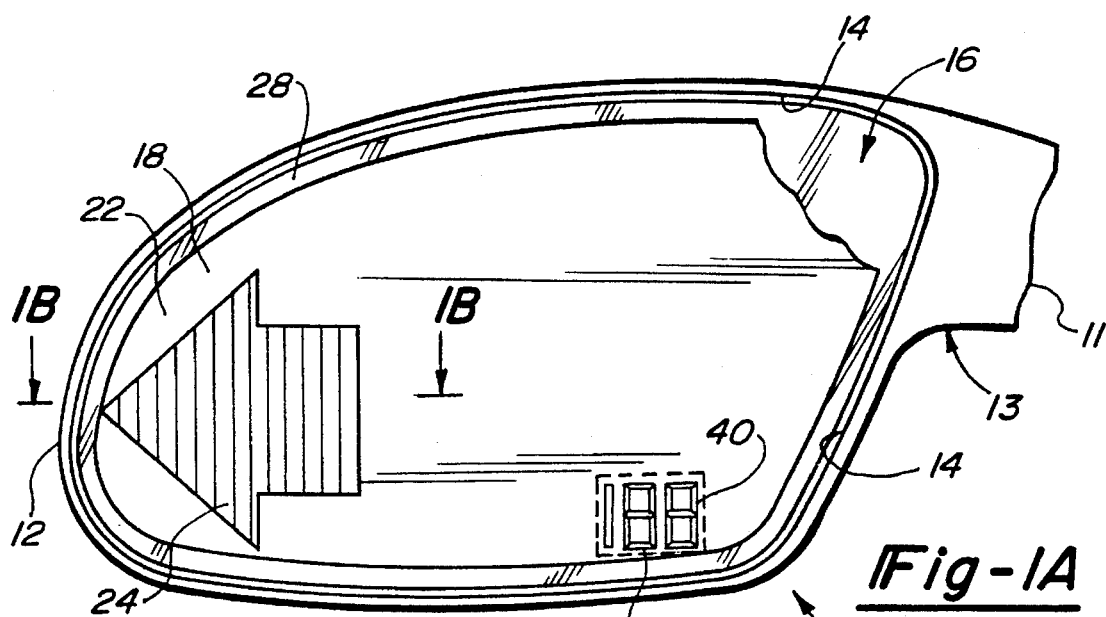
FIG. 1A is a front view of a mirror apparatus in accordance with the present invention.
Figure 1B:
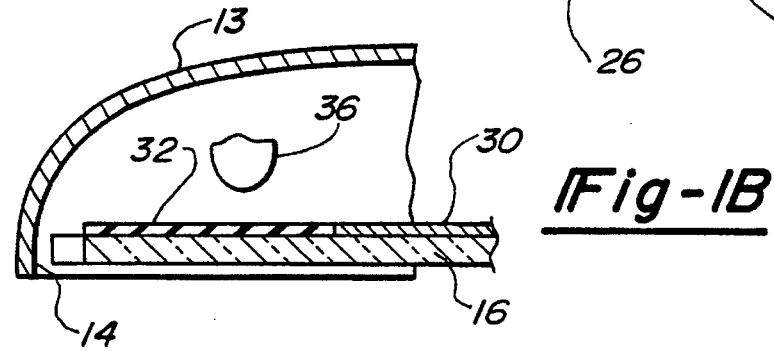
FIG. 1B is a partial cross-sectional view along line 1B—1B, as shown in FIG. 1A.
Figure 2:
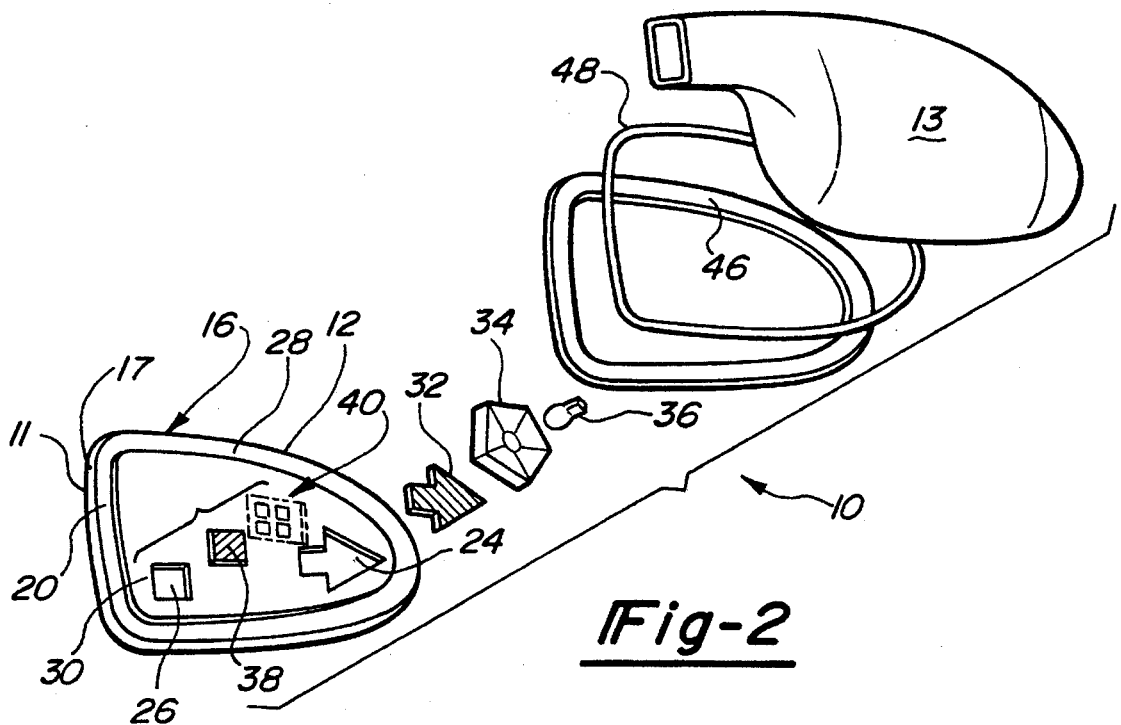
FIG. 2 is a partially exploded rear view of the mirror apparatus in FIG. 1.

A mirror apparatus 10 according to a first embodiment of the present invention, is shown in FIGS. 1A, 1B, and 2. Although the invention will be described and illustrated as a left exterior side mirror for an automotive vehicle, it should be understood that the present invention is also used for the right exterior side mirror. Further, the invention would have benefits in an interior rear view mirror, or any mirror where it is desired to display information. For illustrative purposes, in each of the embodiments described below the invention is shown as a left exterior side mirror mounted on a vehicle.

Further, although this invention is described in the context of providing information to the driver or adjacent vehicles, the light could also be purely functional. As an example, a bright light source could be used to illuminate the area adjacent the vehicle in emergency situations, or could be activated remotely by the driver approaching the car in a dark parking lot.

The mirror apparatus 10, having an inboard side 11 and an outboard side 12, includes a housing 13 having an aperture 14. A mirror glass 16 having a front surface 18 and a rear surface 20 (FIG. 2) is mounted in the aperture 14 of housing 13. A pyrolitic coating 22 on the front surface 18 of the mirror glass 16 is formed in an on-line pyrolitic process whereby several vaporized metal oxide and semiconductor oxide compounds are deposited onto the mirror glass 16. Suitable mirror glass 16 is available from Libbey Owens Ford. The mirror glass 16 has higher durability than silver or chrome coated mirrors and is more environmentally safe. The mirror glass 16 has a first-surface reflectivity of up to 85 percent when provided with an opaque black backmasking on the rear surface 20. When provided with a semi-transparent backmasking on the rear surface 20, the front surface 18 is normally reflective of ambient light but will transmit light of most visible wavelengths from the rear surface 20 to the front surface 18. These coatings and compositions may be altered in components as well as thickness to obtain specific performance criteria.

The above-described pyrolitic coating available from Libbey Owens Ford preferably has a first layer that is a silica compound, with a second coating layer being a tin oxide. A third silicon compound layer is also utilized. Although the entirety of the coating process is not presently known to applicant, the glass is available from Libbey Owens Ford and has many beneficial characteristics.

The mirror glass 16 includes a selectively lit turn signal display section 24, preferably in the shape of an arrow, and located toward the outboard side 12 of the mirror apparatus 10. The mirror glass 16 may alternatively include driver information display section 26 located towards the inboard side 11 of the mirror apparatus 10 and a perimeter display section 28. The perimeter display section 28 is preferably an approximately ¼-inch wide band around the perimeter of the mirror glass 16. Although the mirror apparatus 10 is described here as having display sections 24, 26, and 28 for illustrative purposes, it will be understood that the mirror apparatus 10 could utilize any one, or combinations, of these or other lighted sections.

As can be seen in FIG. 2, a substantially opaque, preferably black, backmask 30 is disposed on the rear surface 20 of the mirror glass 16, except for the display sections. Semi-transparent backmasking, preferably a light control film 32, is disposed on the rear surface 20 of the mirror glass 16 on the turn signal display section 24. The light control film 32 directs light toward the outboard side 12 and adjacent vehicles and away from a driver of the vehicle carrying the mirror. Known light control films 32 commercially available from 3M Company have the property of transmitting light only at predetermined angles with respect to the plane of the film by using microlouvers. The light control film 32 is shown in FIG. 1B and has embedded members 33 which create the light directing louvers. Other known light control films which transmit light at different angles and which transmit light in wider or narrower ranges of angles may be used. The light control film 32 is selected and oriented so that light traveling through the mirror glass 16 from the rear surface 20 to the front surface 18 is directed as desired from the mirror apparatus 10.

Light-directing means, such as a plastic light diffuser 34 disposed on the light control film 32 directs light from a light source 36 mounted in the mirror housing 13 to the light control film 32. The plastic light diffuser 34 provides the turn signal display section 24 with a uniform lighted appearance or glow. Other means for directing light can be used to concentrate, color, filter, or diffuse light, such as a Fresnel lens, a frosted glass lens, or a simple reflector. A wide variety of light sources can be used as the light source 36 in any of the embodiments of the present invention, including LEDs or incandescent or fluorescent light bulbs, which can be utilized in combination with light pipes and fiber-optic cables.

A second light control film 38 is disposed on the rear surface 20 of mirror glass 16 in the driver information display section 26. The light control film 38 can be similar to light control film 32, but is selected and oriented to direct light traveling from the rear surface 20 to the front surface 18 of the mirror glass 16 toward the inboard side 11 of the mirror apparatus 10; i.e., towards the driver. LEDs 40 disposed on the light control film 38 provide information such as temperature, time, speed, etc. to the driver. Light-directing means (not shown) can be used to concentrate, color, filter, or diffuse light from the LEDs 40 to the driver information display section 26. Further, other types of displays, such as a warning light or turn signal, may be provided to give information to the driver.

Semi-transparent backmasking 46 is disposed on the rear surface 20 of the mirror glass 16 in the perimeter display section 28. Light pipe 48 is disposed about the perimeter of rear surface 20 in the perimeter display section 28. In operation, mirror apparatus 10 provides a mirror glass 16 having a front surface 18, the entirety of which normally provides the driver of the vehicle with a reflective view of the area adjacent the vehicle. When the driver activates the vehicles turn signals, the light source 36 generates light diffused by light diffuser 34 and directed by light control film 32 to the area adjacent the vehicle. While the turn signal display section 24 appears to be flashing when viewed from the outboard side 12 of the mirror apparatus 10, the light control film 32 prevents the light from being transmitted toward inboard side 11 of the mirror apparatus 10, thereby providing a completely reflective front surface 18 as viewed from the inboard side 11, by the driver of the vehicle. The turn signal display section 24 is not visible to the driver and does not interfere with the driver's reflective view of the area adjacent the vehicle.

The LEDs 40 behind the driver information display section 26 display information such as temperature, time, or speed which is visible from the inboard side 11 by the driver but is not visible from the outboard side 12. Furthermore, when the LEDs 40 are deactivated, the driver information display section 26 becomes completely reflective for the driver, providing the driver with a reflective view of the area adjacent the vehicle.

When the perimeter light pipe 48 is activated, it provides an aesthetic glow around the perimeter of the mirror apparatus 10 which is visible from all angles because no directional light control film is used in the perimeter display section 28. When the perimeter light pipe 48 is deactivated, the perimeter display section 28 is highly reflective. The perimeter light could also be a high intensity light providing light to the driver as the driver approaches the vehicle in the evening. Such light could be activated by a remote signaling device.

The mirror apparatus 10 can display light of most visible colors and the light source 36, and the LEDs 40 can each generate different colors. The present mirror apparatus 10 is not restricted to narrow spectral light wavelength bands. The LEDs 40 in the driver information display section 26 can even provide an array of LEDs of different colors.

Figure 3:
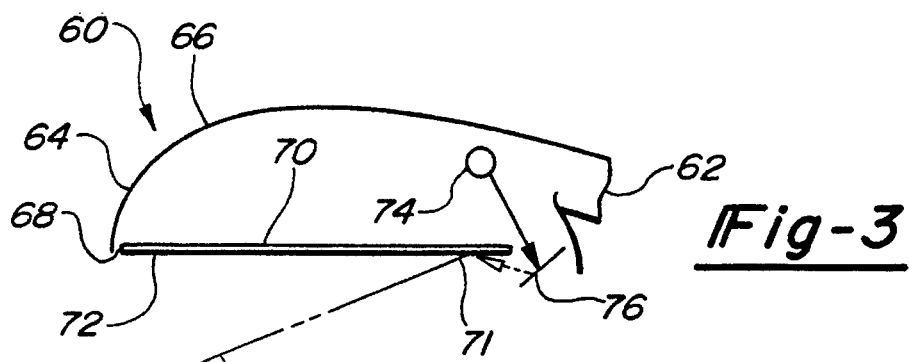
FIG. 3 is a plan view of an alternate embodiment of a mirror apparatus in accordance with the present invention.

A mirror apparatus 60 in accordance with a second embodiment of the present invention is shown in FIG. 3. The mirror apparatus 60 has an inboard side 62 and an outboard side 64 and includes a housing 66 having an aperture 68. A mirror glass 70 having a reflective front surface 72 is mounted over the aperture 68 of the housing 66. The mirror glass 70 can, but need not be, the pyrolitic mirror glass 16 with opaque backmasking 30 described above. In this embodiment, the mirror glass 70 includes a display section 71 which may effectively cover the entire surface of the mirror glass 70. In practice, only a small area would be used. A light source 74 is disposed within the housing 66 behind the mirror glass 70. The light source 74 can be any light source, such as those described above. Light-directing means 76, which is preferably a second reflective surface 76, is mounted on the housing 66 toward the inboard side 62 of the mirror apparatus 60 in front of the mirror glass 16. The light directing means 76, shown in FIG. 3 as a second reflective surface 76, can be planar, convex, concave, or aspheric. Alternatively, a prism could be used. The second reflective surface could be molded or snapped into housing 64. The second reflective surface 76 is oriented to direct the light 77 generated by the light source 74 off the front surface 72 of the display section 71 of mirror glass 70 and toward the outboard side 64 to the area adjacent to vehicle.

Through the use of lenses, light diffusers, reflectors, and other known devices a person of ordinary skill could modify the projected light to display different colors or different shapes such as an arrow to indicate a turn signal.

This embodiment is a lightweight and inexpensive apparatus for providing information in a mirror apparatus 60 and does not require special glass coatings or lenses. In operation, the second reflective surface 76 directs light 77 from light source 74 toward the front surface 72 of mirror glass 70 at an angle, so that the light 77 reflects off the front surface 72 of mirror glass 70 towards the outboard side 64 of the mirror apparatus. The light 77 generated by the light source 74 would therefore be visible in the display section 71 to an observer adjacent the vehicle but would not interfere with the driver's reflective view in the mirror glass 70 of the area adjacent the vehicle.

Alternatively, the display section 71 of the mirror glass 70 can be a defined portion of the mirror which is provided with a light-dispersing surface. This display section 71 can be etched or coated glass or can be a different backmasking than the remainder of the mirror. If the mirror glass 70 has the pyrolitic coating described above, the display section 71 could utilize a different colored backmasking to enhance viewing of the display. It should be understood that with modifications to either above-described, the display section 71 could provide information to the driver of the vehicle, rather than the adjacent vehicles.

Figure 4:
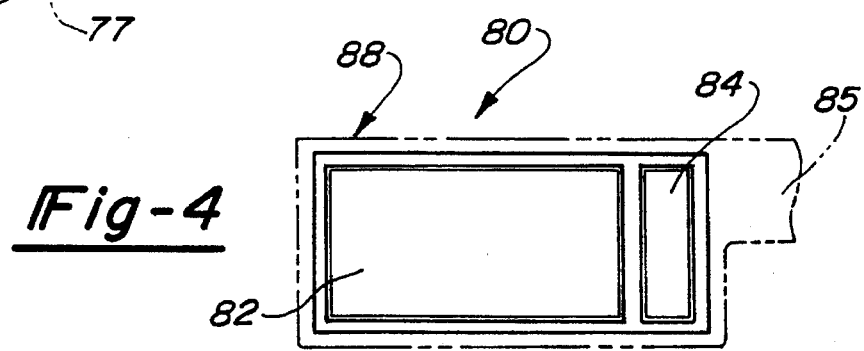
FIG. 4 is a front view of an alternate mirror glass for use in the mirror apparatus of FIG. 3.

FIG. 4 shows an alternate mirror glass 80 for use in the mirror apparatus 60 of FIG. 3. The mirror glass 80 includes a primary reflective surface 82 which is used by the driver to view the area adjacent the vehicle. Mirror glass 80 also includes a secondary display surface 84 toward the inboard side 85. The secondary display surface 84 is substantially conterminous with a display section 84 used to reflect the light 77 from the light directing means 76 towards the outboard side to an observer adjacent the vehicle. A mirror housing 88 ensures that the secondary display surface 84 is not visible from the inboard side 62 by shielding the driver from the display section 84.

Figure 5:
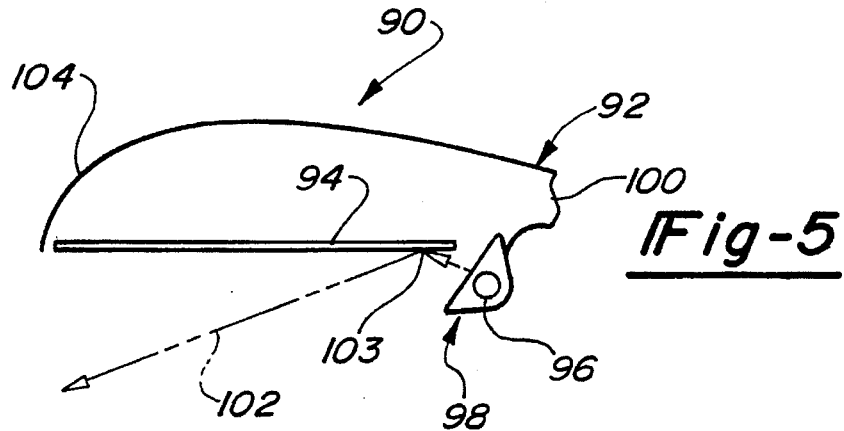
FIG. 5 is a plan view of an alternate embodiment of a mirror apparatus in accordance with the present invention.

Mirror apparatus 90, shown in FIG. 5 in accordance with another embodiment of the present invention, comprises a housing 92 having a mirror glass 94 and a light source 96. The light source 96 is housed in a reflector 98, although other light-directing means, described above, could be used. The light source 96 and reflector 98 are disposed toward the inboard side 100 of mirror apparatus 90 in front of mirror glass 94. The light 102 generated by a light source 96 is directed by reflector 98 to mirror glass 94 where it is visible in a display section 103 of the mirror glass 94 from the outboard side 104. Alternatively, the display section 103 can have light-dispersing characteristics, as described above, to provide information visible from the inboard side 100 of the mirror apparatus 90.

Figure 6:
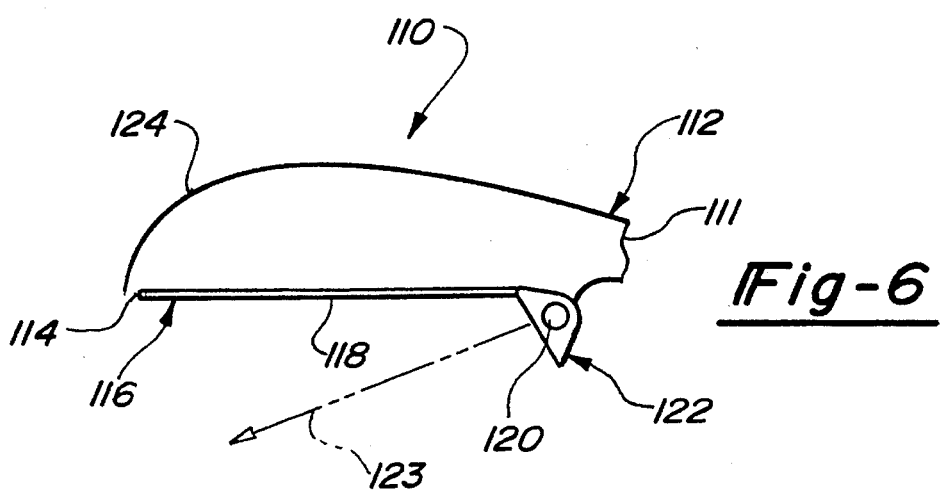
FIG. 6 is a plan view of an alternate embodiment of a mirror apparatus in accordance with the present invention.

FIG. 6 shows a mirror apparatus 110 according to another embodiment of the present invention. Mirror apparatus 110 has an inboard side 111 and includes a housing 112 having an aperture 114. A mirror glass 116 having a front surface 118 is disposed over aperture 114 of housing 112. A light source 120 is housed within a reflector 122 which is mounted on housing 112 toward the inboard side 111 of mirror apparatus 110 in front of mirror glass 116. The light source 120 can be any of the light sources described above. The reflector 122, or other light-directing means, described above, is oriented to direct light 123 from light source 120 directly toward the outboard side 124 of the mirror apparatus 110 to the area adjacent the vehicle.

The light source 120 is shielded from the driver of the vehicle by reflector 122. The reflector 122 does not interfere with the driver's view of mirror glass 116, but provides light 123 towards the outboard side 124 to the area adjacent the vehicle. The light source 120 can generate light 123 of any of most visible colors and can display information, such as a turn signal, to drivers of adjacent vehicles.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A mirror apparatus mounted on a vehicle for providing a reflective view and for projecting light comprising:

a housing mounted on said vehicle a light source for selectively generating light;

a mirror glass providing a reflective view, said mirror glass mounted in said housing, said mirror glass having a display section, said display section reflecting said light from said light source:

said light source positioned in front of said mirror glass and directing light at an angle relative to said mirror glass such that the light is visible to a second observer adjacent said vehicle, but a first observer inside said vehicle cannot see said light.

2. The mirror apparatus of claim 1, wherein said mirror apparatus is mounted on the exterior of said vehicle, said light source illuminating an area adjacent said vehicle.

3. A mirror apparatus mounted on a first vehicle for providing a first observer in the first vehicle a reflective view of the area adjacent the first vehicle while simultaneously displaying information to a second Observer in an adjacent second vehicle comprising:

a housing mounted on said first vehicle;

a light source for selectively generating light for displaying information; and a mirror glass providing the first observer a reflective view of the area adjacent said first vehicle, said mirror glass mounted in said housing;

a display section having the ability to display to the second observer substantially all visible wavelengths of light, said display section displaying said light from said light source; and a second reflective surface positioned in front of said mirror glass, and said light source positioned rearwardly of said mirror glass, said light source directing light off said reflective surface, which, in turn, directs said light such that it is visible, to the second observer but would not be visible to the first observer.

4. The mirror apparatus of claim 3, wherein said mirror glass includes a pyrolitic coating.

5. The mirror apparatus of claim 3, wherein said light source generates substantially all visible light wavelengths.

6. The mirror apparatus of claim 3, wherein said mirror apparatus is mounted on the exterior of said vehicle, said light source illuminating an area adjacent said vehicle.

* * * * *